United States Patent
Matteuzzi

[11] 3,790,134
[45] Feb. 5, 1974

[54] APPARATUS FOR INSPECTING AND CHECKING THE CONDITION OF A TIRE CASING

[76] Inventor: Claudio Matteuzzi, n. 15/6 Via Olmetola, Bologna, Italy

[22] Filed: Mar. 22, 1972

[21] Appl. No.: 236,903

[52] U.S. Cl. .............................................. 254/50.2
[51] Int. Cl. .......................................... B60c 25/14
[58] Field of Search ........................ 254/50.1–50.4

[56] References Cited
UNITED STATES PATENTS

| | | | |
|---|---|---|---|
| 2,797,890 | 7/1957 | Branick | 254/50.3 |
| 2,364,242 | 12/1944 | Prentice | 254/50.4 |
| 2,347,311 | 4/1944 | Branick | 254/50.4 |
| 1,886,834 | 11/1932 | Prentice et al. | 254/50.2 |
| 3,157,387 | 11/1964 | Pinter et al. | 254/50.3 |

*Primary Examiner*—Othell M. Simpson

[57] ABSTRACT

An improvement in a tire casing inspection machine having a continuous moving belt on which the tire is supported in perpendicular relation and rotated and gripping means resting on the bead move the side wall of the casing outwardly or inwardly by means of moving arms.

An adjusting unit is provided which is movable upwards and downwards on a vertical rod perpendicular to the moving belt. Inclined planes are machined into the moving arms, which are secured to a brace, the movement of the said unit determining, in an initial stage, the linear translation of the moving arms and of the brace to which they are secured. The consequent vertical positioning of the grippers is thereby controlled with respect to the moving belt and, in a second stage, the synchronized opening and closing of the moving arms and the consequent identical action of the grippers is controlled on a horizontal plane.

Means are provided whereby the force applied to force apart the side walls of the casing is proportioned to the flexibility of these walls.

3 Claims, 2 Drawing Figures

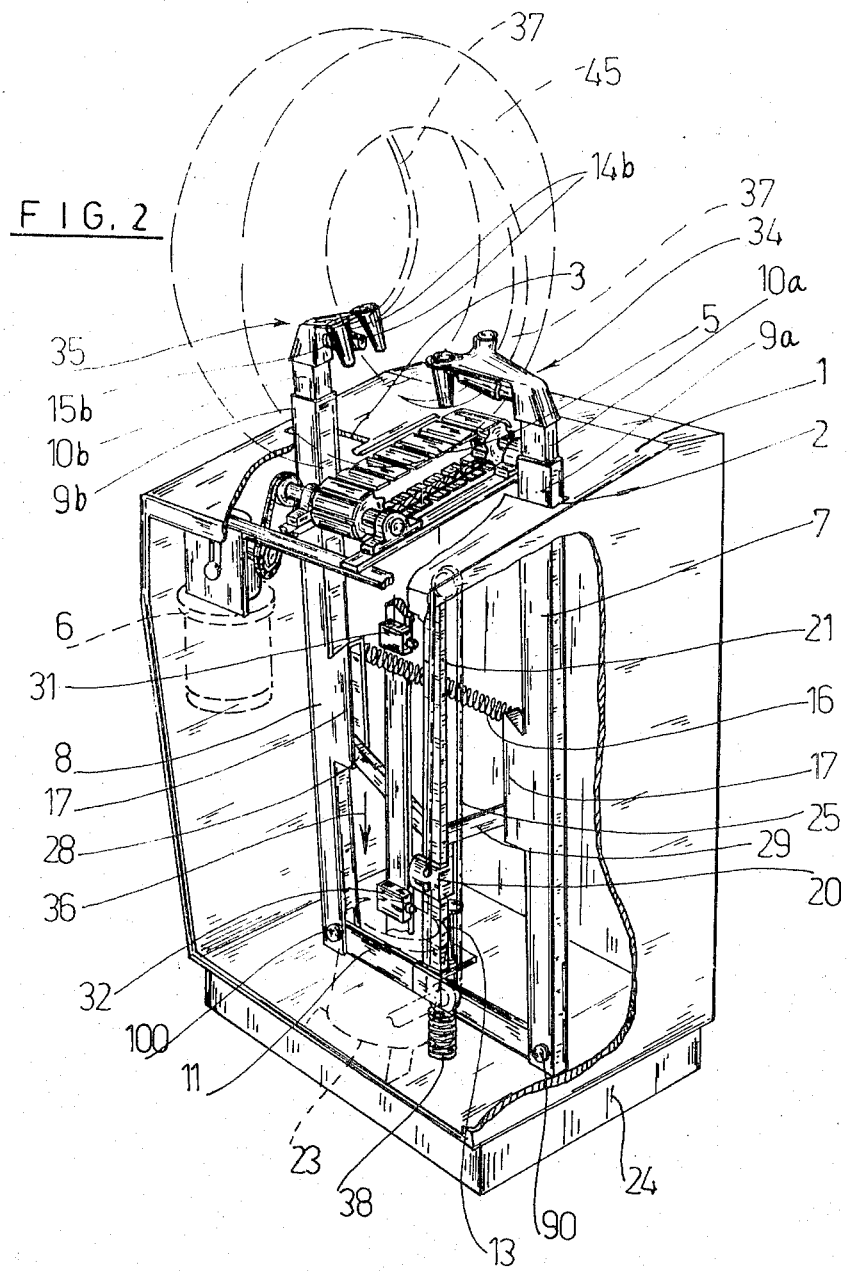

APPARATUS FOR INSPECTING AND CHECKING THE CONDITION OF A TIRE CASING

This invention relates to an apparatus for inspecting and checking the condition of a tire casing or carcass and the condition of the casing either before or after a vulcanizing, recapping, remolding or regroving operation.

BACKGROUND OF THE INVENTION

In order to inspect and check the condition of the casing of a tire, particularly after a vulcanizing operation as well as before and after recapping and remoulding operations, moving belt time inspection machine have been widely used. These moving belt tire inspection machines comprise a moving belt or similar endless support means on which the tire can be rested and can be made to rotate. In these conventional inspecting machines one or more moving arms are provided and gripping means are mounted on these arms to grip and guide the sidewalls of the tire during inspection and means suitable to enable the moving belt to be positioned with respect to the moving arms are also provided to facilitate inspection and positioning of the tire. The conventional tire inspection machine also includes means to apply a tension to the moving arms in a direction away from the walls of the tire so that the sidewalls of the casing are forced apart.

Normally the tension applied to the moving arms on the sidewalls of the casing and the positioning of the belt on which the tire rests, relative to the position of the arms, is determined by displacing forces acting on the said moving arms and the said belt which acts to move the arms as far as they will go but this causes the casing to bulge excessively and unsatisfactorily in the conventional machine because of the sidewalls of the tire being excessively forced apart which tends to injure the bead of the tire. When the sidewalls are forced apart in this way, not only does it cause, as stated above, the casing to bulge but also, in almost every case, it also unsatisfactorily flattens the bead, thereby causing the sidewalls to sink in and this noticeably prejudices the finding of any inner surface tears, bumps or other casing irregularities.

With a view to overcoming the above mentioned problems of reduced inspection efficiency and bead damage, under Italian Pat. No. 821.048, an apparatus has been proposed with which to examine casings which comprises a plurality of rollers which parallel with one another, on which the tire rests and is supported, with the plane on which the said tire lays being perpendicular to the said rollers and a pair of grippers which can be either brought towards each other or be moved away from each other to suit the said plane on which the tire lays, these grippers being located above the aforementioned rollers in such a way that they have an effect on opposite points along the inner borders of the said casing, a peculiarity of the said apparatus being that the tire support rollers and the tire grippers are connected to independent automatically operated means governed by a corresponding control circuit which is provided with a pushbutton control manually operated by the person in charge of the apparatus and thus he is able to vary the spacing of aforementioned rollers and grippers in a controlled manner, that is to say, to bring them together or to space them to suit the distance by which the sidewalls of the tire are forced apart.

Although apparatus of this nature can be satisfactorily used, in particular, for inspecting and checking tire casings of considerable or large dimensions, for which a noticeable and substantial pressure has to be applied to force the sidewalls apart difficulties do occur in handling the tires. In the machine of this Italian patent the separating movement of the side walls and the action of the rollers and the grippers can easily be regulated, insofar as the checking and inspecting of tire casings of average and small sizes are concerned, for which the force required to part the sidewalls of the tire is considerably less, operational difficulties occur in manoeuvring the various units, particularly due to the fact that the force applied to the sidewalls of the tire is never proportional to the characteristics of flexibility of the tire itself; when the dimensions of the tire are considerable, this particular problem is almost unnoticeable but with average and small sized tires, it is, instead, very much felt. In short, the inspection apparatus of the Italian patent is difficult to operate with smaller tires having softer carcasses, because the force or pressure applied to the side walls is not proportional to the flexibility of the case itself and depends instead upon requirements for manoeuvring outside casings.

OBJECTS OF THE INVENTION

The main object of this invention is, therefore, to provide an apparatus for inspecting and checking the condition of tire casing carcasses and the condition of the actual casing, with particular reference to tires for the wheels of motor driven vehicles, whereby the pressure applied to force the sidewalls of the casing under examination apart, is directly proportional to the characteristics of flexibility of the actual casing.

A further object of the invention is to supply an apparatus which is particularly suitable for inspecting and checking motor vehicle tyres yet is extremely simple from a constructional and functional point of view.

SUMMARY OF THE INVENTION

These and other objects are achieved with the apparatus forming the subject of this invention, for inspecting and checking the condition of tire casing carcasses and the condition of the actual casing, the said apparatus being of the type which comprises a continuous moving belt on which the tire rests and by which it is supported, with the plane on which the said tire lays being perpendicular to the said belt and gripping means constituting a pair of grippers which can be either brought towards each other or be moved away from each other to suit the said plane on which the tire lays. The grippers are located above the aforementioned belt and arranged in such a way that their action takes place on opposite points along the inner borders of the said casing. Each of the pair of the grippers is connected, respectively, to a moving arm and the displacements being perpendicular of the moving belt. This causes each gripper to move towards or to move away from the said moving belt. Each of the said moving arms being pivoted, each pivot of each arm is opposite the other, each of the said pivots is located on the moving arm at its lower extremity and each of the pivots of each moving arm is connected, to a brace which can be made to undergo a predetermined spring tensioned movement about an axis perpendicular to the moving belt, this predetermined movement being caused by the said moving arms being interconnected through the medium of spring loaded members. Additionally each arm is provided with inclined sliding planes positioned in relation to the moving belt to thereby present opposite divergent and inter-convergent sections, respectively. The combination of gripping means, moving arm, pivot connection and incline sliding planes constitute a unit movable upwards and downwards which is on a vertical rod, said rod being mounted on the frame and being positioned in a direction which is perpendicular to the moving belt, the movement of the movable unit controlled by a pre-set means which acts in conjunction with a motor; the movable unit is also provided with limiting means to work in conjunction with the inclined planes these limiting means being machined into the moving arms, the movement of the said unit determining, in an initial stage, a linear translation of the moving arms and the consequent positioning vertically of the grippers with respect to the moving belt and, in a second stage, the synchronized opening and closing of the said grippers on a plane which is horizontal with respect to the said moving belt. The support arms for the grippers are extensible depending upon the resistance offered by the tire to the forking, pulling and pushing action of the said grippers.

BRIEF DESCRIPTION OF THE DRAWING

Further characteristics and advantages will be seen more clearly from the ensuing detailed description of a preferred embodiment for the apparatus forming the subject of the invention and from the accompanying drawings which are given for guidance, wherein:

FIG. 2 shows a further perspective view of the apparatus, again with parts cut away.

DESCRIPTION OF THE PREFERRED EMBODIMENT

Figure 1:
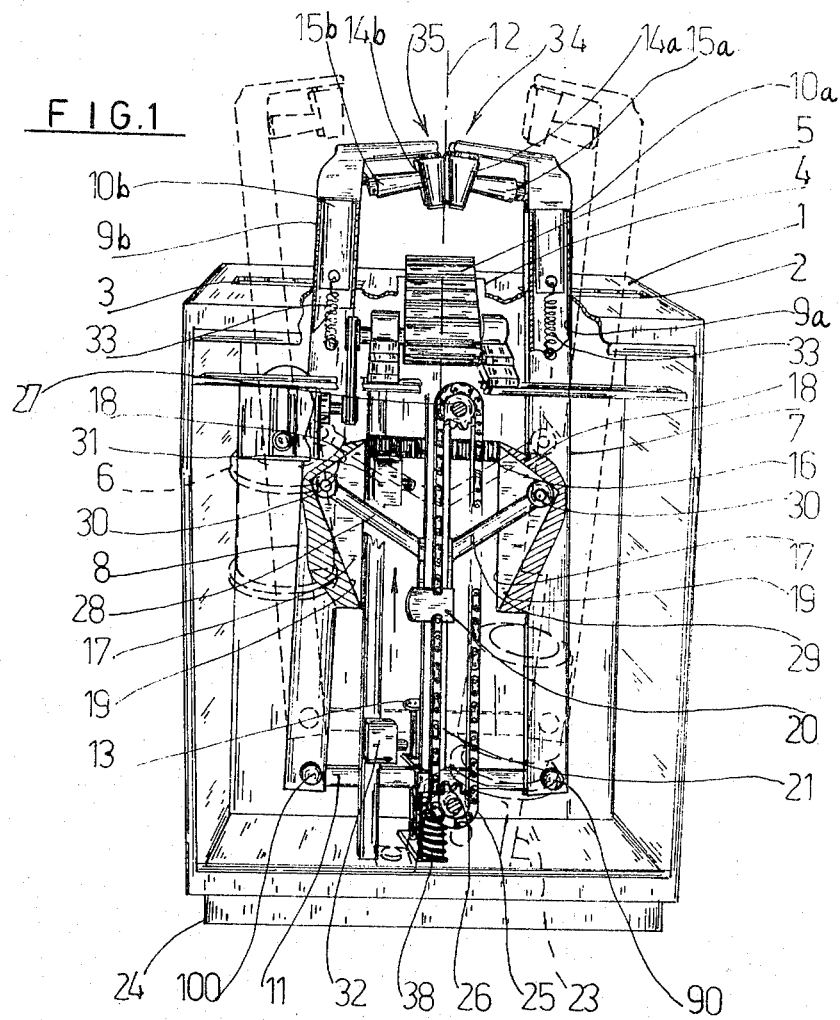
FIG. 1 illustrates a perspective view of the box shaped apparatus with parts cut away for visualizing the internal construction and operation; and cutaway of the parts in order that their operation can be more readily appreciated, whilst

It can be seen from FIG. 1 that the apparatus has a frame which is virtually in the shape of a box and that on the upper part 1 of the box shaped apparatus there are provided apertures 2, 3 and 4 through which the movable arms and the continuous horizontal placed moving belt 5 through which these project. The belt 5 is centrally located and the vertical axis 12 of the box like apparatus passes through the belt.

As shown in FIGS. 1 and 2, the continuous moving belt 5 is supported by the frame of the apparatus and supports the tire as shown in FIG. 2, its movement being controlled by conventional power take off through a motor gearbox 6 which is also carried by the said frame. The belt engages the tread of the tire by friction contact so that movement of the belt produces a resulting rotation of the tire.

As is shown in FIG. 2, the top of the belt 5 projects considerably above the upper part 1 through the aperture 4. The movable arms on each side of the tire engage the respective inner belts and inner surfaces of the tire walls with the tire aligned on vertical axis 12 and rotating on rollers 14a 14b (right side of FIG. 1) and 15a 15b (left side of FIG. 1).

Two arms 7 and 8 are pivoted at their lower extremity 90 and 100, respectively, to a moving brace 11 which has freedom of movement over the control vertical axis 12 with the upward movement of the brace 11 being limited by a tie rod 13 and the downward movement of the brace 11 being limited by a spring 38 which is carried by the frame.

The moving arms 7 and 8 which, as is shown in FIG. 1, extend above the upper part 1 through the apertures 2 and 3, both consist of two tubular outer members 9 and two inner tubular members 10, the latter members 10 being telescoped inside the tubular members 9 and being held in a stable "off" position with respect to the members 9 by means of a spring 33, the ends of spring 33 being connected to the telescoped tubular members 10 and to the tubular members 9, respectively. The upper extremities of the telescoped members 10 have fixed to them, the gripping means for gripping the tires 34 and 35 which each consist of two truncated cone shaped rollers 14 which are rotatable around spindles which are substantially parallel to the movable vertical arms 7 and 8 and the gripping means further consists of a truncated cone shaped roller 15 which is placed between the rollers 14 adjacent each roller 14, and is rotatable around a spindle perpendicular to the horizontal spindles of the rollers 14.

The movable arms 7 and 8 are linked to each other, under constant spring tension and in a flexible fashion, by means of a spring 16 and each arm is provided with a mouth shaped machine member 17, one on each side and each mouth shaped member being opposite the other, the inside of each mouth shaped member being machined on its inner surface which beads against each arm 7 and 8 respectively, in such a way that each mouth shaped member is provided with two opposite inclined planes 18 and 19 which are angularly fixed yet connected by means of a joining spring and thereby in contact by said joining member with each other.

A moving sleeve 20 surrounds rod 21 and travels along the vertical rod 21 which is carried by the framework of the apparatus, and vertical movement is controlled by a motor operated gearbox 23, the gear box being supported by the bedplate 24 of the framework and the gear box being connected to the said sleeve by means of a chain 25 which turns around a cog wheel 26 mounted on the shaft of the motor gearbox 23 and around a counter cog wheel 27, the ends of the said chain being secured to the said sleeve 20. The upward movement of the moving sleeve 20 is represented by the vertical arrow shown in FIG. 1.

The sleeve 20 is integral with two cross members 28 and 29, and is positioned along the vertical axis 12 by these cross members the end of each cross member being pivoted to a roller 30 which fits into the inclined planes 18 and 19 which have been machined into the angular surfaces of the arms 7 and 8, and as particularly shown in FIG. 1.

Two limit contacts 31 and 32 are tripped by the sleeve 20 when the sleeve is moving the distance limit represented by these contacts and these contacts operate the motor gearbox 23 and cause it to cut out, thereby limiting the travel of the said sleeve 20.

OPERATION FOR CASING INSPECTION

With reference to the foregoing, a description will now be given of how the apparatus forming the subject of the invention operates:

When the gear is engaged 23, the sleeve 20 is made to move in the direction of the arrow shown in FIG. 1 adjacent vertical axis 12 and pointing upwardly and as a consequence of this, there is, at the same time, an upward movement on the part of the moving arms 7 and 8 and of the brace 11.

The movement of these latter three members 7, 8 and 11 is determined by the fact that, as is shown in FIG. 1, in the first or initial stage the rollers 30 are positioned at an intermediate point between the two inclined planes 18 and 19 so that the only tension on arm 7 and 8 is the spring-tension of spring 16. Since the arms 7 and 8 are linked to each other by means of the spring 16 and since, in this initial stage, they are not subjected to any force of reaction from the tire or from the motor or any other parts of the apparatus, and the rollers 30 which obviously cannot work in conjunction with the inclined planes 18 and 19 because of the tension exerted by the spring 16, pull the said arms upwards and with them, pull the brace 11 upwards to which the said arms are secured.

During this initial stage, once the brace 11 has moved as far as the limiting tie rod 13 will allow the brace 11 to go, it stops and thus causes the arms 7 and 8 to also stop but the sleeve 20 continues its travel and the rollers 30 fit into the inclined planes 18 and 19, overcome the pull of the spring and cause the arms 7 and 8 to fork, thereby parting the grippers 34 and 35 in the manner indicated the transition from the solid line showing at the top of the box like apparatus to the dotted lines in FIG. 1.

As the sleeve 20 continues to travel, it trips the limit contact 31 which operates the motor gearbox 23, causes it to stop and consequently also stops the sleeve 20 from moving.

When the apparatus is in this position, the tire to be examined is rested on the belt 5 so that the plane on which it lays 45 is perpendicular to the belt 5 itself.

At this juncture, the gear 23 is manually engaged and this causes the sleeve 20 to move in the direction of the arrow 36, with the initial result being that the apparatus is returned to the starting condition described above and referred to the initial working phase. What then transpires is that the rollers 30 gradually give way on the inclined planes 18 to the pulling action of the spring 16 which causes the arms 7 and 8 to move towards each other and, as a consequence of this causes the grippers 34 and 35 to close.

This approach enables the rollers 14 to be inserted inside the borders of the tire under inspection.

As the sleeve 20 continues its downward travel, on account of the rollers 30 not engaging with the inclined planes 19, there is a downward movement on the part of the arms 7 and 8 and of the gripping means comprising grippers 34 and 35.

At this stage, the rollers 15 of the grippers 34 and 35 make contact with the bead 37 on the casing under examination and apply a certain and predetermined pressure to it.

Depending upon the resistance offered by the sidewalls of the tire to the action of the said rollers 15 and once the pulling action of the springs 11 has been overcome, the members 10 constituting the arms 7 and 8 (see FIG. 2) are withdrawn and this prevents the rollers 15 from applying an excessive pressure to the bead 37.

The sleeve 20 continues its downward travel and the brace 11 to which the arms 7 and 8 are secured, is pulled by the spring 38 and is gradually made to brake until it is at a standstill.

What then takes place is that the rollers 30 engage with the inclined planes 19 and, when the pull exerted by the spring 16 has been overcome, this causes the said arms to move away from each other, the grippers 34 and 35 moving in similar fashion or likewise and, as a result of the action of the rollers 14 on the borders of the sidewalls of the tire, the said sidewalls to be forced apart.

In the final stage of the downward movement of the sleeve 20, it trips the limit contact 32 which disengages the drive of the motor gearbox 23 and stops the said sleeve from moving.

At this juncture, the continuous belt 5 is then given its motion from the motor gearbox 6 and, as a result of the action of the grippers 34 and 35 which prevent the tire from undergoing any displacement, the said belt causes the casing to rotate so that the condition of its interior can be carefully inspected.

Upon completion of the inspection operation, through the motor gearboxes 6 and 23, the conveyor belt 5 is halted and the sleeve 20 is returned to its highest point of ascent so that a fresh operating cycle can be commenced.

The embodiment described above has been given as an example and it is obvious that modifications and variants of a constructional nature may be introduced without the invention in any way deviating from the framework of the claims:

What we claim is:

1. In an inspection machine comprising a box-like frame, at least three apertures about the center portion of the top of the frame, a continuous moving belt over a centrally located aperture on which the upright tire can be rested and be made to rotate, by frictional engagement with the plane on which the said tire lays being perpendicular to the said belt and gripping means for the tire bead comprising a pair of grippers each through an aperture on each side of the central aperture, which can be either brought towards each other or moved away from each other, that improvement comprising:

mounting means for each of said grippers to project the gripper above the said belt;

extensible means actuating the grippers including oppositely placed moving arms which are mounted in such a way on the frame that their action takes place on opposite points along the inner borders of the casing below the bead;

said moving arms being pivoted to a brace which can undergo a predetermined movement about a central axis which is perpendicular to the moving belt;

each of said arms being interconnected through the medium of spring loaded members and constituting a yoke-shaped unit;

each moving arm being provided with inclined sliding planes positioned opposite divergent and interconvergent sections, respectively;

an adjusting drive unit being provided which is movable upwards and downwards on a vertical rod and is perpendicular to the moving belt;

said inclined planes which are machined into the moving arms determining the movement of the said unit and the vertical position of the grippers in an initial stage, and the linear translation of the moving arms and brace; and, the opening and closing of the moving arms, in a second stage, and the consequent identical action of the grippers being controlled by said unit on the horizontal plane in a second stage.

2. An inspection machine as claimed in claim 1 provided with a motor and gear box for driving said adjusting driving means, and with a chain drive, cogwheel and counter-cogwheel constituting the power take-off from the shaft of the gear box, said cogwheel providing movement in one direction and the counter-cogwheel movement in the opposite direction and wherein limit contacts are provided at extreme upper and lower locations to cut out the motor when tripped by said sleeve.

3. An inspection machine as claimed in claim 1 wherein said extensible means constituting the oppositely placed moving arms each consists of telescoping inner and outer tubes, and wherein said spring means includes one spring at the bottom of each inner member and another single spring which links the arms together in such manner that arm movement actuating the gripper against opposite tire wall is tensioned by said single spring.

\* \* \* \* \*